July 27, 1948. F. O. WISMAN 2,445,900
POWER BOOSTER FOR AIRCRAFT CONTROL SURFACES
Filed Feb. 20, 1943 4 Sheets-Sheet 1

INVENTOR
FRANKLIN O. WISMAN
BY
A. R. McCrady

July 27, 1948.  F. O. WISMAN  2,445,900
POWER BOOSTER FOR AIRCRAFT CONTROL SURFACES
Filed Feb. 20, 1943  4 Sheets-Sheet 2

INVENTOR
FRANKLIN O. WISMAN
BY
A. R. McCrady

July 27, 1948. F. O. WISMAN 2,445,900
POWER BOOSTER FOR AIRCRAFT CONTROL SURFACES
Filed Feb. 20, 1943 4 Sheets-Sheet 3

INVENTOR
FRANKLIN O. WISMAN
BY
A. R. McCrady

July 27, 1948.  F. O. WISMAN  2,445,900
POWER BOOSTER FOR AIRCRAFT CONTROL SURFACES
Filed Feb. 20, 1943  4 Sheets-Sheet 4

INVENTOR
FRANKLIN O. WISMAN
BY
A. R. McCrady

Patented July 27, 1948

2,445,900

UNITED STATES PATENT OFFICE 2,445,900

POWER BOOSTER FOR AIRCRAFT CONTROL SURFACES

Franklin O. Wisman, South Bend, Ind., assignor to Bendix Aviation Corporation, South Bend, Ind., a corporation of Delaware Application February 20, 1943, Serial No. 476,509

4 Claims. (Cl. 244—82)

This invention relates to devices for controlling the movement of a body through a fluid medium, and particularly relates to the control of the movable surfaces of an aircraft whereby its motion in flight will be controlled according to a desired flight condition and/or according to the force required to maintain a desired flight condition.

More particularly the invention relates to the control of auxiliary surfaces which are movable relative to the main control surfaces of an aircraft. Modern high speed aircraft impose tremendously high forces on the control surfaces thereof when in flight. These forces, which are created by the movement of the control surface against the slip stream of the aircraft, are oftentimes of such magnitude that manual control by the pilot is made exceedingly difficult, and where the forces become greater than those which can be overcome by physical strength alone, it is no longer possible to maintain the ship in flight for a desired particular speed and flight attitude. Accordingly, it has become the practice in the aircraft art to mount auxiliary control surfaces, as explained above, known as trim tabs, which will supplement the force necessary to maintain the main control surfaces against the slip stream. As is known to those skilled in the aircraft art, these auxiliary control surfaces move angularly opposite to the angular movement of the main control surface. For example, in the case of a rudder surface, which is movable in a counterclockwise direction when looking down on a ship, the auxiliary control surface will be moving in a clockwise direction relative thereto. It will be seen, therefore, that for a particular flight attitude, in order to maintain the force necessary to move or maintain the main control surface, for example the rudder, against the slipstream at a constant, it will be necessary to move the auxiliary control surface greater or less amounts with respect to the main control surface.

Many attempts have been made to maintain the force required to maintain the main control surface in position at a constant. One such attempt has been to increase the displacement of the auxiliary control surface with respect to the main control surface as the displacement of the main control surface is increased. While this may be a worthwhile expedient for a particular set of flight conditions, it is not entirely successful, since an aircraft in flight is constantly undergoing ever changing flight conditions.

Another attempt to maintain the force required to maintain the main control surface in position at a constant has been the provision of means at the control of the pilot for manually moving the auxiliary control surface to a position where the effort required to maintain the main control surface in position will be kept below a maximum permitted value. As explained above, since flight conditions are ever varying, it becomes necessary manually to operate the auxiliary control surface almost constantly. Obviously this imposes an additional duty on the pilot, who already has manifold duties which require the greatest amount of attention on his part.

With the foregoing problems in mind, it is an object of this invention to provide a novel control mechanism for the control surfaces which will reduce the force required to operate the control surfaces.

Another object of the invention is to provide a novel mechanism for operating the auxiliary control surface of an aircraft which will augment the force required to operate the main control surfaces to reduce the amount of manual effort required.

Still another object comprehends a novel device for manually moving the auxiliary control surfaces, but which will furnish power to means for moving the auxiliary control surface to maintain a particular flight condition.

A further object includes the provision of a novel mechanism for determining the movement of an auxiliary control surface according to the force required to operate the main control surface.

Yet another object includes the provision of a novel circuit and a mechanism therein for determining the movement of an auxiliary control surface.

A still further object comprehends the provision of a novel circuit for determining the movement of the auxiliary control surface according to the force required to keep the main control surface in a desired position, to reduce the amount of the force required.

A still further object comprehends provision of means for returning an aircraft to a desired flight condition after a completion of a maneuver as for example, a dive, according to the choice of the pilot.

A still further object comprehends the provision of a pressure sensitive device for moving the auxiliary surface in a direction to reduce the force applied by the pilot to the main control surface necessary to maintain a particular flight condition.

A feature of the invention includes a novel power transmitting mechanism for moving the auxiliary control surface.

A yet further object includes the provision of novel means for preventing the movement of said auxiliary control surface beyond desired positions.

Yet another object includes means for maintaining a manual setting of an auxiliary control surface, but without being disturbed by the power operation of said auxiliary control surface thereafter.

Other objects and features of the invention will be apparent from a study of the description and the drawings forming a part of this specification, but it is to be understood that the drawings and the description illustrate a preferred embodiment of the invention, the scope of the invention not being determined or limited by the terms of the embodiment shown, nor otherwise than by the terms of the subjoined claims.

In the drawings which will be referred to in describing the invention:

Figure 1:
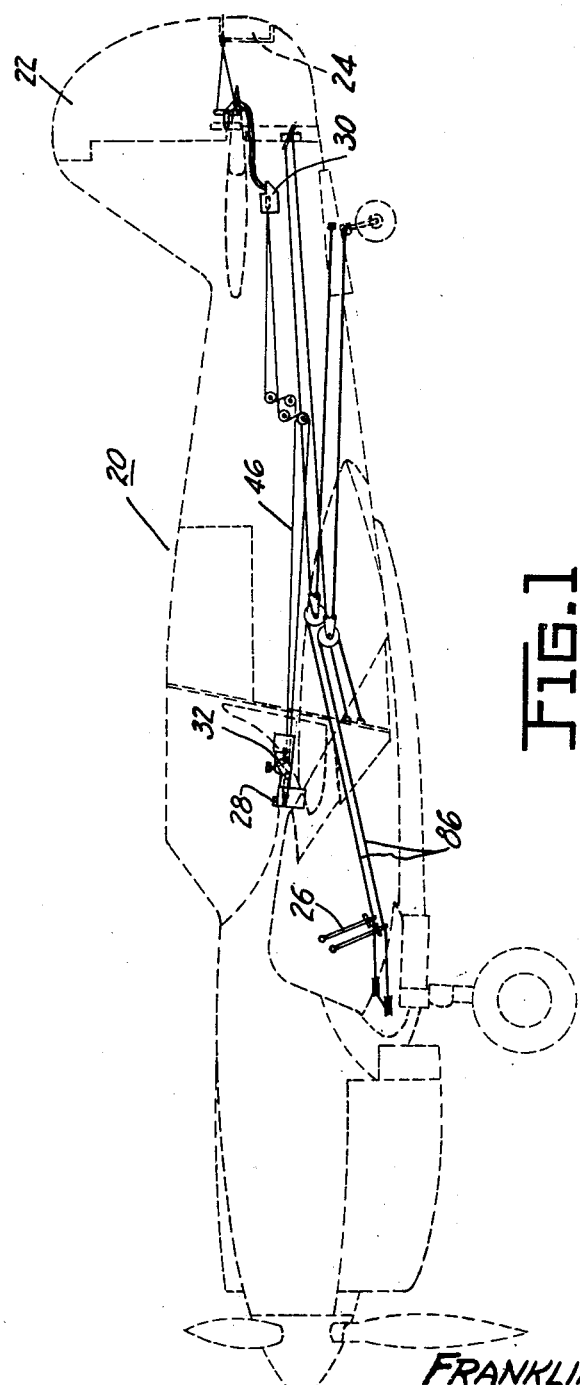
Figure 1 is a phantom elevation view of a modern military aircraft having incorporated therein the invention as applied to the rudder surface and to the auxiliary rudder surface, or rudder trim tab, of said aircraft.
Figures 4, 7:
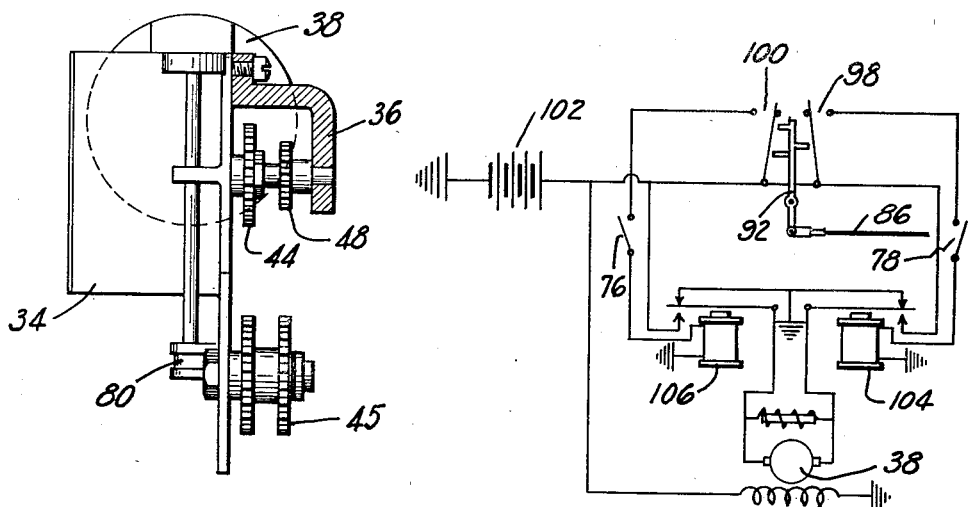
Figure 4 is a front view of the power mechanism shown in Figure 2.
Figure 3:
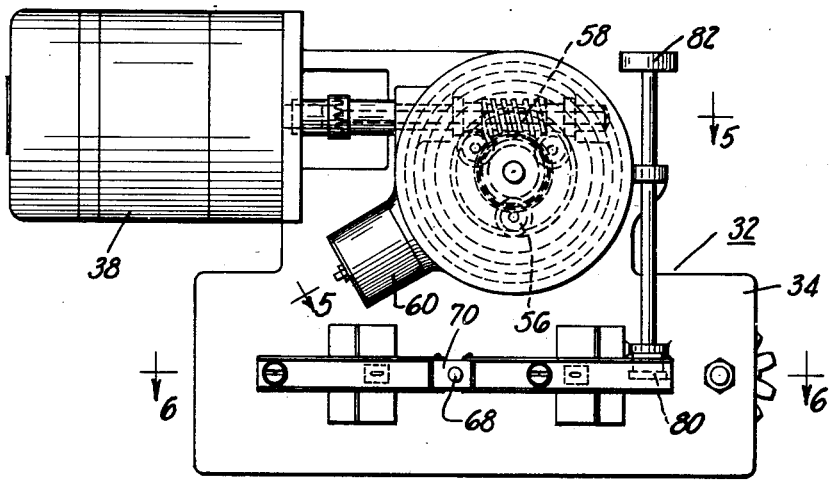
Figure 3 is an elevation view of the power mechanism shown in Figure 2, looking at the opposite side thereof.
Figure 8:
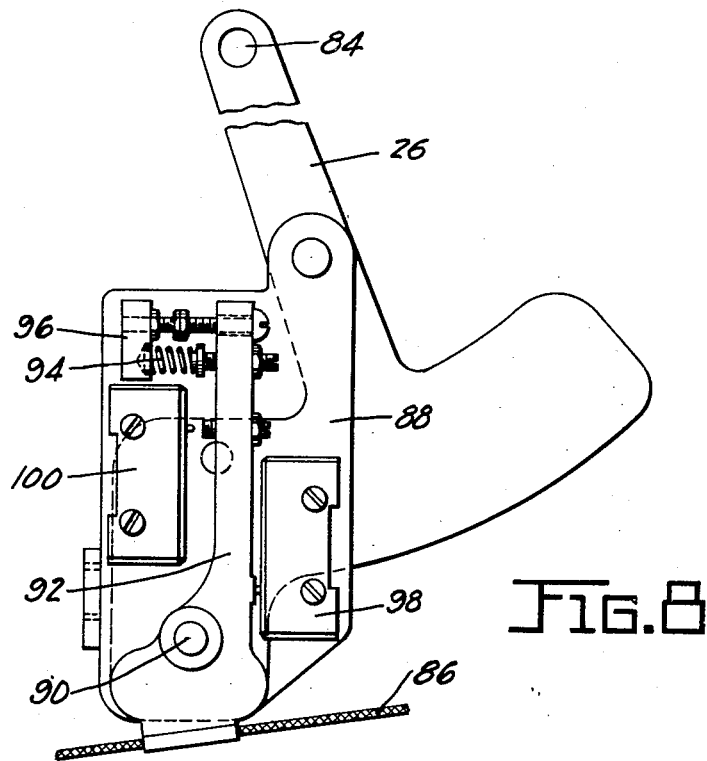

Figure 7 is a wiring diagram showing a novel circuit for controlling the operation of the power means shown in Figures 2 to 6 inclusive; and Figure 8 is a fragmentary elevation view of a rudder bar mounted in the aircraft shown in Figure 1, having mounted thereon a pressure sensitive device for controlling the operation of the circuit shown in Figure 7, and the power mechanism shown in Figures 2 to 6 inclusive.

While the invention is described as applied to the control of the rudder trim tab and to the rudder surface, it can be applied equally as well to the trim tab surfaces used in conjunction with the elevators. Obviously, also, it may be applied to the control of the auxiliary surfaces, or trim tabs, used in connection with the aileron surfaces.

Referring now particularly to Figure 1 of the drawings, there is shown a modern military aircraft 20 having the usual rudder surface 22, which has mounted for relative movement thereto an auxiliary control surface or trim tab 24. The movement of the main rudder surface 22 is accomplished by moving the rudder bars 26, which are connected through a system of cables, in the manner shown. The control of the auxiliary control surface 24 or trim tab has been heretofore done manually, and the invention hereinafter described includes means for manually moving the trim tab 24 as well as moving said trim tab by power means. As shown, the manual movement of the trim tab 24 is accomplished by manipulating a hand wheel 28 which through a suitable system of sprockets and chains and through a gear box 30 moves the trim tab 24 to any desired position. A power means for effecting the automatic movement of the trim tab 24 is shown at 32 and includes the provision of means whereby the manual setting made through the manipulation of the hand wheel 28 will not be disturbed when the power means, shown at 32, comes into operation.

Figure 2:
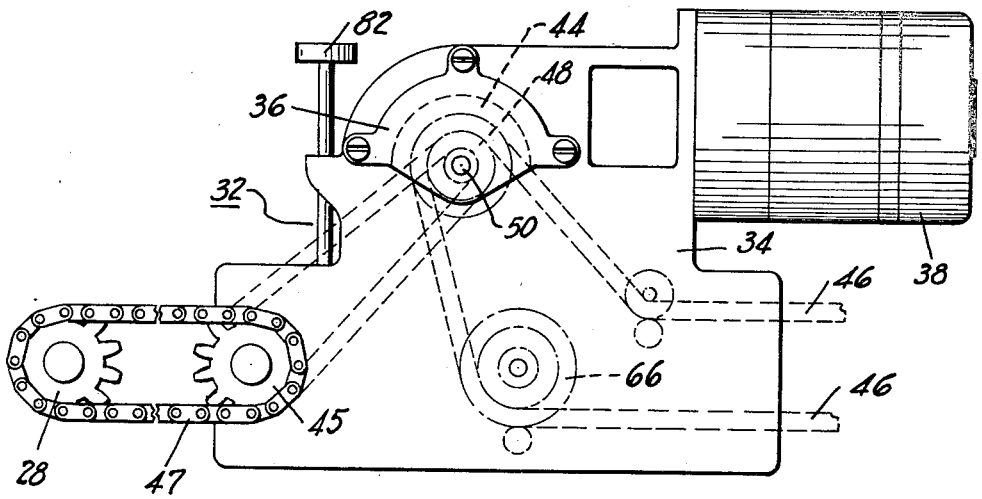
Figure 2 is a side elevation view of the power mechanism for moving the auxiliary control surface forming a part of this invention.

Referring now particularly to Figure 2, the means for effecting the manual setting of the trim tab 24 and the power means for automatically effecting the movement of the trim tab 24 comprises a housing 34 which contains a differential system 36 shown in phantom outline, and includes a motor 38 attached to the housing 34 for effecting the movement of the planetary train 36.

Figure 5:
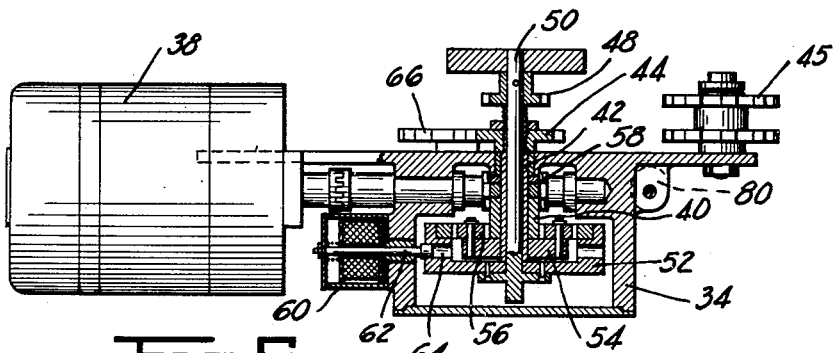
Figure 5 is a partly plan view of the power mechanism shown in Figures 2 and 3, and a sectional view taken substantially along the line 5—5 in Figure 3.

Referring more particularly to Figure 5, the differential system 36 comprises a sun gear 40 which floats upon a hollow shaft 42 which is journalled in the housing 34. At one end of the hollow shaft 42 and within the housing 34 there is secured a spider 54 which supports for rotation a plurality of gears 56 which engage the sun gear 40.

Adapted to rotate within the hollow shaft 42 is a shaft 50 which supports at one end, within the housing 34, an internally toothed cup gear 52, the teeth of which engage the teeth of the gears 56. The exterior end of the shaft 50 carries a sprocket 48 which is adapted to transmit rotation to the shaft 50 and the cup gear 52 through the medium of a chain which rides on sprocket 48 and one of a pair of sprockets 45 which is journalled in the housing 34. The other of the pair of sprockets 45 carries a second chain 47 which is moved by manipulating the hand wheel 28 shown in Figure 1.

The exterior end of the hollow shaft 42 has secured thereto a sprocket 44 over which a trim tab drive chain 46 is adapted to travel to move the gears within the gear casing 30 whereby the trim tab 24 will be moved in any desired direction.

The sun gear 40 is driven by means of the motor 38 through a worm and worm wheel arrangement 58 which is irreversible. It will be seen, therefore, that when the shaft 50 and the cup gear 52 are rotated by manipulating the hand wheel 28 that rotation of the sprocket 44 and travel of the trim tab drive chain 46 will be effected, since the sun gear 40 will be held immovable because the worm and worm wheel arrangement 58 is irreversible.

Means are provided for preventing the disturbance of the hand wheel setting of the trim tab 24 explained above, when the power means for driving the trim tab comes into operation. These means include a locking solenoid 60, connected in parallel to the circuit for supplying energy to the motor 38, which is so arranged that upon energization of the solenoid 60 an armature 62 is attracted to the right to engage radially disposed recesses 64 in the cup gear 52. Thus, since the cup gear is held immovably upon the operation of the motor 38, the rotation of the sun gear 40 will, through the worm and worm wheel 58, effect rotation of the spider 54 and the sprocket 44 upon the end of its hollow shaft 42.

Means are provided for limiting the travel of the trim tab surface 24 beyond predetermined limits, and for returning the trim tab to a predetermined desired position at the completion of a maneuver. As shown particularly with reference to Figure 6, these means include an idler sprocket 66 which is rotated by the movement of the chain 46. The idler sprocket 66 is journalled in the casing 34 and is attached to a lead screw 68 which has mounted thereon for axial movement a yoke 70, having pivotally secured thereto a pair of arms 72 and 74. Depending on the movement toward the body 34 or away therefrom, the arms 72 and 74 will make and break a limit switch 76 and an index switch 78, which is connected in a circuit for controlling the movement of the motor 38, as will be described hereinafter. For determining the time at which the index switch 78 will be closed or opened a cam 80 actuated by a trim tab position selector wheel 82 shown in Figures 2 and 4 is provided. It will be noted that the arm 74 has two points about which it may pivot. When the yoke 70 has moved sufficiently toward the housing 34 the arm 74 will pivot about the index switch 78 keeping it closed, and when the yoke 70 has moved sufficiently outwardly, the arm 74 will pivot about the cam 80 keeping index switch 78 open.

The function of the trim tab position selector 82 and its accompanying cam 80 is threefold. It serves as a control for stopping the trim tab 24 in one direction as it approaches its mechanical limit of movement in that direction, and it may serve as a selector for a desired trim tab position for a desired attitude of flight at the completion of a maneuver, as for example, a dive. Also it may serve for the purpose of selecting a trim tab position corresponding to a desired flight attitude for a particular set of conditions including load and speed variables.

Figure 6:
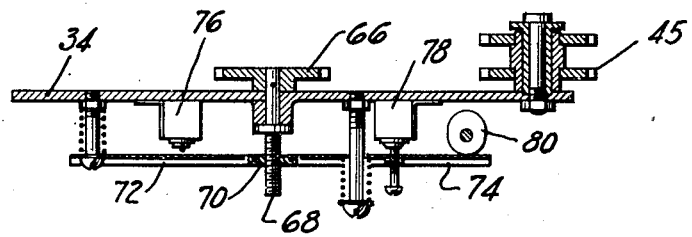
Figure 6 is a section taken along the line 6—6 in Figure 3.

The function of the limit switch 76 is to prevent the movement in one direction of the trim tab 24 beyond its mechanical limit of travel by the motor 38. As shown in Figure 6 the switch 76 is so arranged that when the yoke 70 travels toward the free end of the lead screw 68, the switch 76 will open, thereby preventing passage of current to the motor 38. However, the switch 76 is so arranged that it will be closed whenever the trim tab 24 is moving to a position to decrease the physical force necessary to maintain the main rudder surface 22 against the slip stream, opening only when the mechanical limit of travel is reached, to prevent damage to the trim tab 24.

Referring now more particularly to Figure 8, the control of the circuit for effecting the operation of the power means will now be described. The control is described with reference to the left rudder bar of the pair of rudder bars 26 shown in Figure 1, but the control could be applied as well to each of the rudder bars, the construction shown in Figure 8 being particularly adapted to the use contemplated. The rudder bar 26 is shown pivoted as at 84 and the clockwise movement of the bar places a pull on a rudder cable 86 which moves the rudder surface 22 in a clockwise direction, as viewed from above, to effect a movement to the left of the aircraft 20. Mounted on and near the bottom of the rudder bar 26 is a plate 88 which has pivotally mounted with respect thereto at 90 a switch closing arm 92. It will be seen that when clockwise movement is given to the rudder bar 26 the switch closing arm 92 will tend to move in a counterclockwise direction with respect to the mounting plate 88. However, this counterclockwise movement of the swtich closing arm 92 is restrained by means of a spring 94 which abuts an ear-like projection 96 from the plate 88.

When the force necessary to maintain the rudder surface 22 in the position heretofore explained, lies below an upper critical value, the spring 94 will tend to move the switch closing arm in a clockwise direction thereby closing a low force switch 98. However, when the force required to maintain the rudder surface in the position previously explained becomes greater than a selected critical value, the switch closing arm 92 will tend to move in a counterclockwise direction with respect to the mounting plate 88 against the spring 94, thereby tending to close a high force switch 100. The effect of closing either one of these two switches will be described hereinafter.

The circuit for controlling the movement of the motor 38 and for automatically controlling the movement of the auxiliary control surface or trim tab 24 for keeping below an upper limit the force required to maintain the rudder surface against the slip stream of the aircraft 20 shown in Figure 1, is shown with respect to Figure 7. A source of power 102 is provided which supplies current to the movable switch arms of the low force switch 98 and the high force switch 100. When the low force switch 98 is closed at its right hand contact point shown in Figure 7, current is passed to a relay 104 through the index switch 78. With the relay 104 energized, its armature is attracted downwardly, thereby closing the circuit through the armature of the motor 38 and the locking solenoid 60, thereby causing the motor 38 to rotate, which in turn causes the sun gear 40 to revolve and the trim tab chains 46 to be moved to a position whereby the force required to hold the rudder bar in position will be increased to open the low force switch 98. Thus, when the force for maintaining the rudder 22 against the slip stream of the aircraft 20 is increased above a low selected limit the switch 98 will open, and the movable switch arm will close on the left point. At this time the relay 104 will be deenergized, and the armature circuit of the motor 38 will be shorted, thereby effecting dynamic braking of the motor to bring the motor quickly to a stop.

The control circuit shown in Figure 7 includes a second branch for effecting rotation of the motor in an opposite direction to move the trim tab 24 to a position whereby the force required to maintain the rudder 22 against the slip stream will be decreased. When the switch closing arm 92 (shown in Figure 8) has moved counter-clockwise relative to the support plate 88 the switch arm of the switch 100 will have closed on the left-hand contact of the switch 100 as shown in Figure 7. At this time current will be passed through the switch arm of the high force switch 100 through the limit switch 76 which at this time will be closed, to energize a relay 106 to attract the armature thereof downwardly to close the armature circuit of the motor 38, thereby causing the trim tab 24 to be moved in an opposite direction to decrease the force necessary to maintain the rudder 22 against the slip stream. After the trim tab 24 has moved to the position to maintain below the upper limit the force required, the switch arm of the high force switch 100 will close on its right-hand contact point thereby deenergizing the relay 106, and shorting the armature circuit of the motor 38.

It will be seen that whenever the armature circuit is closed, and the motor 38 begins to operate, the locking solenoid 60 shown in Figure 5 will come into operation thereby locking the internally toothed gear 52 to maintain the setting originally had by the manual control 28.

When the left branch of the circuit shown in Figure 7 is supplying current to the motor 38 to move the trim tab 24 in one direction the yoke 70 will move on lead screw 68 to open limit switch 76 and the relay 106 will be deenergized dynamically to brake motor 38 to prevent overtravel of the tab 24.

The right branch of the circuit shown in Figure 7 is included in the means for giving a setting to the trim tab 24 for a desired flight attitude after the completion of a maneuver, as for example, a dive. The function of the index switch 78 and the setting of the hand wheel 82 accomplishes this purpose. When the hand wheel 82 is rotated to a position whereby the cam 80 occupies the position shown in Figure 6 the index switch 78 will be closed, and as the lead screw 68 rotates in a direction to cause yoke 70 to move downwardly as shown in Figure 6, the beam 74 tends to pivot about cam 80, and when the yoke 70 has moved a sufficient distance switch 78 will open thus deenergizing relay 104 in Figure 7. With the index switch 78 open, the trim tab 24 will occupy the position as determined by the setting of knob 82. It is to be remembered, however, that trim tab 24 may not be in alignment with rudder surface 22, provided the setting of hand wheel 82 is other than the zero setting. Depending upon whether the hand wheel 82 is to the left or right of the zero position, the tab 24 will take a corresponding angular deflection with respect to the rudder 22.

The counter-clockwise rotation of the idler sprocket 66 and lead screw 68 is in accordance with the left or forward movement of the upper trim tab chain 46. The position of the yoke 70 on lead screw 68, which of course corresponds to a definite position of trim tab drive chain 46, determines the point at which beam 74 is lifted to open index switch 78 as determined also by the profile of cam 80.

The operation of the invention described above is as follows:

The pilot may rotate the hand wheel 28 to give a manual setting of the trim tab 24 which will make the force necessary to be applied to the rudder bars 26 as low as desired. This he may do without using the automatic principle described. However, with the automatic control described, the trim tab will move to keep the force required between desired limits to maintain the rudder bar 26 in position. As has been described with reference to Figures 7 and 8, as soon as the force required exceeds an upper limit, high force switch 100 will close, and by means of motor 38, the trim tab 24 will be driven in a direction to decrease the force required; similarly, when the force required to maintain the rudder bars 26 in position falls below a lower force limit, low force switch 98 will close, and will drive motor 38 and trim tab 24 in the opposite direction to increase the force necessary to maintain rudder bars 26 in position.

Assuming now that the pilot is flying in a straight line and that the pilot wishes to make a turn to the left, as he applies a force to the left rudder the rudder surface 22 tends to rotate into the slipstream and the consequent force on the rudder surface tends to rotate same back to the neutral position. When the pilot has supplied sufficient force to close the high force switch 100, the relay 106 controlled by switch 100 is energized to supply current to the trim tab drive motor 38 in such a direction as to rotate trim tab 24 in a direction opposite to the direction of rotation of rudder surface 22. This will cause the trim tab 24 to extend into the slip stream on the other side of the rudder, and the component of the force against trim tab 24 will be in such a direction as to cause trim tab 24 and rudder surface 22 to which it is attached to be rotated in a direction which the pilot is trying to effect. When the movement of trim tab 24 has resulted in the desired position of rudder 22, the pilot will no longer need exercise a high force to maintain that position, and at this time high force switch 100 will open thereby stopping motor 38 by dynamic braking.

The motor 38 will remain stopped until the pilot wishes to cease turning the aircraft 20, at which time he will apply force to the opposite rudder pedal when the low force switch 98 will close to energize relay 104 and thus supply current to motor 38 to drive it and trim tab 24 in the opposite direction tending to bring trim tab 24 into alignment with movable rudder surface 22.

The control system may also be used in other ways. It may be used as a dive control by which the pilot, before going into a dive, may adjust hand wheel 82 (and cam 80) for whatever setting of tab 24 he anticipates needing after recovering from the dive. He may on the other hand, adjust the position of hand wheel 82 for an extreme anti-dive setting of trim tab 24, and on recovering from the dive in whatever attitude of flight he desires, he will maintain a force on rudder bar 26 between the low force value and the high force value. This will allow him to drive tab 24 towards or beyond the neutral position as far as he likes, the tab 24 being driven whenever the force falls below the value set for low force switch 98, and the motor 38 being stopped when the force exceeds the low force value and intermediate the high force value determined by the value of high force switch 100.

The invention has been described with reference to its use in controlling the movements of a rudder trim tab, but it will be apparent to those skilled in the art that it may equally as well be applied to the aileron surfaces and the elevator surfaces. Accordingly, the invention is limited only by the scope of the claims hereto appended.

I claim:

1. In an airplane, a control surface, manual means for moving said surface, an auxiliary surface mounted on said control surface and manually and automatically movable relative thereto, power means for automatically altering the position of said auxiliary surface relative to the control surface when the force for moving the control surface manually varies beyond a predetermined limit, whereby said control surface is also caused to move, said power means including a planetary gear and an electric motor drivably connected to the planetary gear, a control circuit for the electric motor and including a device responsive to the predetermined force applied to the manual means tending to move said control surface to thereby energize said motor to cause said auxiliary surface to be moved, a switch mechanism in the control circuit, manually adjustable indexing means operatively connected with the switch for preselecting the maximum displacement of said auxiliary surface for a desired flight attitude at the conclusion of a maneuver, and a hand wheel operatively connected through the planetary gear to said auxiliary surface for manually changing its position relative to the main surface.

2. In an electrically operated control for aircraft, a main surface articulated to the aircraft, an auxiliary surface articulated to the main surface and movable relative thereto, manual control means for moving the main surface, power means for moving the auxiliary surface relative to the main surface when the force required to move the main surface exceeds a predetermined value, said power means including a planetary gear having ring, planet, and sun gears and an electric motor drivably connected to said sun gear and constructed and arranged to provide an irreversible connection therewith, a control circuit for the power means, means in the control circuit responsive to the predetermined force applied to said manual means to tend to move said main surface for connecting said power means to said auxiliary surface to move the same, limit switches in the control circuit for limiting the relative movement of the surfaces, means driven by said power means for operating said limit switches, manually adjustable indexing means disposed between said last-named means and one of said limit switches for preselecting the maximum displacement of said auxiliary surface, a hand wheel constructed and arranged to rotate the ring gear for manually positioning the auxiliary surface relative to the main surface, a planet carrier on which the planet gears are mounted in meshing relationship with the sun and ring gears, said planet carrier drivably connected to the auxiliary surface and constructed and arranged to be driven by the sun or ring gears, and means for holding said ring gear fixed when the auxiliary surface is moved by said power means.

3. In an airplane, a control surface, manual means for moving said surface, an auxiliary surface mounted on said control surface and manually and automatically movable relative thereto, power means for automatically altering the position of said auxiliary surface relative to the control surface when the force tending to move the control surface manually varies beyond a predetermined limit, whereby said control surface is caused to be moved, said power means including a planetary gear arrangement and an electric motor for driving said planetary gear arrangement, a control circuit for said power means comprising a device responsive to the predetermined force tending to move the control surface manually for energizing said motor, a hand wheel adapted for manual operation of said auxiliary surface, said hand wheel being connected to said planetary gear arrangement for manipulating the auxiliary surface at times, a control element in the control circuit constructed and arranged for maintaining the hand wheel in its initial setting when the auxiliary surface is automatically moved, and indexing means associated with the control circuit for determining the maximum displacement of said auxiliary surface, said indexing means being manually adjustable for a predetermined flight attitude.

4. In an airplane, a control surface, manual means for moving said surface, an auxiliary surface mounted on said control surface and manually and automatically movable relative thereto, power means for automatically alternating the position of said auxiliary surface relative to the control surface when the force for moving the control surface manually varies beyond a predetermined limit, whereby said control surface is caused to be moved, said power means including a planetary gear arrangement and an electric motor for driving said planetary gear arrangement, a control circuit for said power means comprising a device incorporating a low force switch and a high force switch constructed and arranged to respond to the force applied to said manual means tending to move the control surface, whereby energization of said motor is controlled, a hand wheel adapted for manual operation of said auxiliary surface, said hand wheel being connected to said planetary gear arrangement for manipulating the auxiliary surface at times, and indexing means associated with the control circuit and having a manual adjustment for determining the maximum displacement of said auxiliary surface for a desired flight attitude at the conclusion of a maneuver.

FRANKLIN O. WISMAN.

REFERENCES CITED

The following references are of record in the file of this patent:

UNITED STATES PATENTS

| Number | Name | Date |
|---|---|---|
| 1,365,347 | Schneider | Jan. 11, 1921 |
| 1,377,306 | Brush | May 10, 1921 |
| 1,536,996 | Winter | May 5, 1925 |
| 1,882,730 | Avery | Oct. 18, 1932 |
| 2,183,932 | Carlson | Dec. 29, 1939 |
| 2,272,725 | Overbeke | Feb. 10, 1942 |
| 2,277,378 | Wells | Mar. 24, 1942 |
| 2,317,383 | Hull | Apr. 27, 1943 |

FOREIGN PATENTS

| Number | Country | Date |
|---|---|---|
| 383,590 | Great Britain | Nov. 17, 1932 |